Patented Aug. 7, 1934

1,969,277

UNITED STATES PATENT OFFICE 1,969,277

GLASS COMPOSITION FOR ELECTRICAL DISCHARGE DEVICES

Marcello Pirani, Berlin - Wilmersdorf, Martin Reger, Berlin, and Georg Gaidies, Berlin-Pankow, Germany, assignors to General Electric Company, a corporation of New York No Drawing. Application January 21, 1931, Serial No. 510,222. In Germany February 8, 1930

5 Claims. (Cl. 106—36.1)

The present invention relates to gaseous electric discharge devices generally and more particularly the invention relates to such devices in which the gaseous content is a metal vapor, or in which a metal vapor is a component of the gaseous content.

It is well known in the art that a gaseous electric discharge device having a filling of cadmium metal vapor emits a pleasing greenish blue light; however, it is also well known in the art that such cadmium vapor filled electric discharge devices have hitherto been of slight practical use because the cadmium vapor condenses readily at temperatures above the melting temperatures of the usual glasses used in the containers of such devices, and further the glass container of such devices becomes coated with a brown or black coating after a short period of operation of the device to change the color of the cadmium vapor discharge.

It is the object of this invention to produce a glass suitable for use in the arts generally and particularly as the container for cadmium vapor filled electric discharge devices. We have discovered that such a glass having the desired characteristics of being easily workable, highly heat resisting, and chemically stable in the presence of an alkali metal vapor such as a cadmium vapor filling for example, may be produced if a boro-silicate glass containing besides the usual boric acid, alkalies, and alkali earths also contains at least 10% aluminum oxide ($Al_2O_3$) and less than 60% silicic acid ($SiO_2$), where the proportions are given in percentages by weight. A glass container made in accordance with the above formula does not become noticeably browned or blackened after 1,000 hours of operation as we have proven by experiment.

A suitable glass is produced if the constituents are mixed in percentages by weight according to the following formula:—

40 to 60% boric oxide ($B_2O_3$)
4 to 5% sodium oxide ($Na_2O$)
10 to 11% calcium oxide ($CaO$)
11 to 13% alumina ($Al_2O_3$)
20 to 30% silica ($SiO_2$)

A particularly good glass of the above type for the containers of electric discharge devices having alkali metal vapor fillings is a glass having the following composition in percentages by weight:—

50% boric oxide ($B_2O_3$)
4% sodium oxide ($Na_2O$)
11% calcium oxide ($CaO$)
13% alumina ($Al_2O_3$)
22% silica ($SiO_2$)

It is possible to reduce the alkali and alkali earth content of the boric acid part of the glass slightly and to replace these by additional amounts of aluminum oxide and silicic acid in accordance with the following formula:—

8.5 to 15% boric oxide ($B_2O_3$)
1.2 to 2% sodium oxide and potassium oxide ($Na_2O+K_2O$)
13 to 15% calcium oxide and magnesium oxide ($CaO+MgO$)
19 to 23% alumina ($Al_2O_3$)
40 to 60% silica ($SiO_2$)

A particularly good glass of the above type for the containers of electric discharge devices having alkali metal vapor fillings is a glass having the following composition in percentages by weight:—

15% boric oxide ($B_2O_3$)
2% sodium oxide and potassium oxide ($Na_2O+K_2O$)
15% calcium oxide and magnesium oxide ($CaO+MgO$)
23% alumina ($Al_2O_3$)
45% silica ($SiO_2$)

The silicic acid of the boro-silicate glass in both cases may be replaced in part, for example, up to one half, by the oxides of rare earths, such as the oxides of lanthanum or didymium, or by a mixture of such oxides.

As the glass disclosed above is slightly hygroscopic it is desirable that the container of an electric discharge device made of such glass be protected from the surrounding atmosphere by a covering or casing made of a non-hygroscopic glass well known in the art, such as Thüringer glass, which has a better acid, lye and water stability than the boro-silicate glass of the present invention. Thüringer glass and the boro-silicate glass of this invention have approximately the same coefficients of expansion and are capable of being fused together to form a double walled or a single walled two-layer container where that is desired. Where desired the Thüringer glass may be replaced by a heat absorbing glass, such as the Schottshen glasses BG 9 and BG 10, which absorb the heat radiating from the electric discharge and which are raised to a high temperature to prevent condensation of the metal vapor, such as cadmium vapor, and a consequent loss of vapor pressure even with an extremely cold outside temperature.

Where desired the non-hygroscopic glass has a widely different coefficient of expansion than the boro-silicate glass of the present invention provided there is no point of fusion between the outer container made of the non-hygroscopic glass and the inner container made of the boro-silicate glass of the present invention and the current leads sealed into each container have different coefficients of expansion over their length to correspond approximately to that of the glass containers at the sealing in points of said wires in said containers.

What we claim as new and desire to secure by Letters Patent of the United States, is:

1. A glass containing between
   40 to 60% boric oxide ($B_2O_3$)
   4 to 5% sodium oxide ($Na_2O$)
   10 to 11% calcium oxide (CaO)
   11 to 13% alumina ($Al_2O_3$)
   20 to 30% silica ($SiO_2$).

2. A glass containing:—
   50% boric oxide ($B_2O_3$)
   4% sodium oxide ($Na_2O$)
   11% calcium oxide (CaO)
   13% alumina ($Al_2O_3$)
   22% silica ($SiO_2$).

3. A glass containing the usual glass bases as alkalies, alkali earths, and boric oxide mixed with not less than 10% aluminum oxide ($Al_2O_3$) and not less than about 20% and less than 60% silica ($SiO_2$).

4. A glass containing between
   8.5 to 15% boric oxide ($B_2O_3$)
   1.2 to 2% sodium oxide and potassium oxide ($Na_2O+K_2O$)
   13 to 15% calcium oxide and magnesium oxide (CaO+MgO)
   19 to 23% alumina ($Al_2O_3$)
   40 to 60% silica ($SiO_2$).

5. A glass containing
   15% boric oxide ($B_2O_3$)
   2% sodium oxide and potassium oxide ($Na_2O+K_2O$)
   15% calcium oxide and magnesium oxide (CaO+MgO)
   23% alumina ($Al_2O_3$)
   45+ silica ($SiO_2$).

MARCELLO PIRANI.
MARTIN REGER.
GEORG GAIDIES.